United States Patent [19]

Ando

[11] Patent Number: 5,702,863
[45] Date of Patent: Dec. 30, 1997

[54] PRODUCTION METHOD OF INK-OOZING PLATE FOR STAMP

[75] Inventor: Yoichi Ando, Sagamihara, Japan

[73] Assignee: Mitsubishi Pencil Kabushiki Kaisha, Tokyo, Japan

[21] Appl. No.: 594,919

[22] Filed: Jan. 31, 1996

[30] Foreign Application Priority Data

Feb. 3, 1995 [JP] Japan .................. 7-017358

[51] Int. Cl.⁶ ........................................ G03F 7/00
[52] U.S. Cl. .................... 430/200; 430/306; 430/944; 430/964
[58] Field of Search ................. 430/306, 320, 430/199, 200, 202, 204, 205, 944, 964

[56] References Cited

U.S. PATENT DOCUMENTS

| | | | |
|---|---|---|---|
| 3,742,853 | 7/1973 | Landsman | 430/306 |
| 4,064,205 | 12/1977 | Landsman | 430/200 |

FOREIGN PATENT DOCUMENTS

| | | |
|---|---|---|
| SHO49-7003 | 1/1974 | Japan . |
| SHO50-155323 | 12/1975 | Japan . |
| SHO51-95469 | 8/1976 | Japan . |
| SHO52-71710 | 5/1977 | Japan . |
| SHO57-136652 | 8/1982 | Japan . |
| SHO60-193686 | 10/1985 | Japan . |
| HEI3-96383 | 4/1991 | Japan . |
| 6-155698 | 6/1994 | Japan . |

*Primary Examiner*—John A. McPherson
*Attorney, Agent, or Firm*—Darby & Darby

[57] ABSTRACT

A production method of an ink-oozing plate for stamp having open cells, in which the production steps and the apparatus are simple, and an ink-oozing plate for stamp which can provide a sharp impress image and is conveniently used, that is, to provide a production method of a stamping plate in which a stamping plate can easily be produced with a small flashlight irradiating energy, including such a method as using a heat transfer sheet coated with a heat transfer substance which generates heat by irradiating with infrared rays and can be transferred, irradiating with infrared rays while pressing a stamp material, and coating an impress image copy with a liquid substance containing water, and thus coming to complete the production method of the ink-oozing plate for stamp of the present invention.

4 Claims, 2 Drawing Sheets

PRODUCTION METHOD OF INK-OOZING PLATE FOR STAMP

BACKGROUND OF THE INVENTION

1. Field of the Invention

The present invention relates to a production method of an ink-oozing plate for stamp, more specifically to an improvement in a production method of an ink-oozing plate for stamp comprising a sponge material having open cells, wherein stamping can be repeated without supplying stamp ink for a long time by impregnating a stamp material in advance with a stamp ink.

2. Description of the Related Art

Known is a stamp in which a stamp material comprises sponge rubber having open cells and stamp ink is occluded in advance in the sponge rubber in order to save time for applying a stamp ink on a printing face every time a stamping plate or a stamp is affixed. A production method of the stamp described above is disclosed in Japanese Patent Application Laid-Open No. Sho 60-193686, in which the whole part of a sponge surface excluding a part where an impress image is formed is caused to subside concavewise by heating embossing processing to harden it by pressing, and a convex part is turned into an impress image-forming part which functions as a stamp ink occluding part, and a method in which a porous matter is adhered by pressing on a similar heated plate is disclosed as well in Japanese Patent Application Laid-Open No. Sho 50-155323. However, these methods require molds which serve as heating plates and labor for engraving or etching characters, marks and figures thereon.

Further, production methods of stamping plates are disclosed in Japanese Patent Application Laid-Open No. Sho 57-136652 and Japanese Patent Application Laid-Open No. Sho 49-7003, wherein a photopolymerizable liquid resin is applied on the surface of a stamp material; a positive film is put on the top face thereof, and UV rays are applied from the upper part to cause a photopolymerization reaction; and then, an unreacted resin is removed by rinsing to expose the surface of the stamp material from the removed part. Also, a planographic stamp prepared by the similar method using a negative film is disclosed in Japanese Utility Model Application Laid-Open No. Sho 52-71710. However, these methods have complex steps such as a preparation of a negative or positive film, coating of resins, photopolymerization, and rinsing, and therefore production methods by which desired stamps can be quickly provided are desired. That is, a production method of a stamping plate in which a stamping plate can easily be produced with a small flashlight irradiating energy is expected.

The following is disclosed in Japanese Patent Application Laid-Open No. Hei 3-96383. That is, "an engraving original subjected to plate making is laminated and adhered closely on the surface of a porous material, and a clogging resin as means of preventing from passing stamp ink is put on the surface of the engraving original to print with a squeegee. This clogging resin passes through an image aperture part on the engraving original and is impregnated into the surface of the porous material in a shape corresponding to the image aperture part to clog pores at this part. After this clogging resin is cured, stamp ink is impregnated all over the porous material, whereby it can be used as a stamp".

As described above, conventional production methods of ink-oozing plate for stamps having open cells are troublesome and can not provide sharp impress images. Accordingly, a production method which can quickly provide a desired stamp having a sharp impress image is desired.

SUMMARY OF THE INVENTION

An object of the present invention is to solve the problems described above and to provide a production method of an ink-oozing plate for stamp having open cells, in which the production steps and the apparatus are simple, and an ink-oozing plate for stamp which can provide a sharp impress image and is conveniently used, that is, to provide a production method of a stamping plate in which a stamping plate can easily be produced with a small flashlight irradiating energy.

Investigations repeated intensively by the present inventors in order to achieve the objects described above have resulted in finding such a method as using a heat transfer sheet coated with a heat transfer substance which generates heat by irradiating with infrared rays and can be transferred, irradiating with infrared rays while pressing a stamp material, and coating an impress image copy with a liquid substance containing water, and thus coming to complete the production method of the ink-oozing plate for stamp of the present invention.

That is, the production method of the ink-oozing plate for stamp of the present invention is characterized in comprising:

superposing a heat transfer sheet comprising an infrared ray-transmittable film coated thereon with a heat transfer substance on the surface of an elastic resin-made stamp material having stamp ink-impregnable open cells so that the above heat transfer substance contacts the surface of the stamp material;

superposing thereon a desired impress image copy so that it becomes a mirror image;

irradiating with a flashlight containing infrared rays from the upper part of the above copy to allow the infrared rays to be transmitted through a copy image-absent part on the impress image copy and cause the infrared rays reaching the heat transfer sheet to heat the heat transfer substance present on a part corresponding to the above copy image-absent part;

causing the above heat transfer substance to transfer on the surface of the stamp material and melt the surface layer of the stamp material to form a heat transfer substance-transferred part and a stamp material-molten part (a stamp ink-non-oozing part) where the open cells are blocked, and allowing the copy image part on the impress image copy to cut off or absorb the infrared rays to cause no heat transfer substance present on the part of the heat transfer sheet corresponding thereto to be heated, which does not lead to blocking the cells present on the surface of the corresponding stamp material, to form a non-transfer part (a stamp ink-oozing part).

The preferred stamp material used in the production method of the ink-oozing plate for stamp of the present invention is a sheet with a thickness of 0.5 to 30 mm comprising polyolefin series foam in which the melt temperature is 50° to 150° C. and which has fine open cells having a cross-linked network structure and an average pore diameter of 2 to 10 μ, and a porosity of 30 to 80%, and the heat transfer sheet is prepared by coating an infrared ray-transmittable sheet with the heat transfer substance containing at least carbon or a high polymer and having a transfer temperature of 50° to 200° C. to a thickness of 5 to 10μ. It is preferred to apply a flashlight in the state that the stamp material is compressed by 5 to 70% to form a concave part in which the stamp ink-non-oozing part of the stamp material resides in a lower plane than the stamp ink-oozing part and to coat the impress image copy with a liquid substance.

The ink-oozing plate for stamp of the present invention comprises a stamp ink-impregnated part comprising an elastic resin-made stamp material having stamp ink-impregnable cells, and a printing face comprising a stamp ink-oozing part formed on the surface of the above stamp material and a stamp ink-non-oozing part, wherein the above stamp ink-non-oozing part comprises a heat transfer substance-transferred part where the heat transfer substance is transferred by heat generation and a stamp material-molten part where the stamp material is molten by the heat generation of the above heat transfer substance.

The other ink-oozing plate for stamp of the present invention comprises a stamp ink-impregnated part comprising a stamp material composed of a polyolefin series foam sheet having a melt temperature of 50° to 150° C., an average pore diameter of 2 to 10μ, a porosity of 30 to 80%, and a thickness of 0.5 to 30 mm, and a printing face comprising a stamp ink-oozing part formed on the surface of the above stamp ink-impregnated part and a stamp ink-non-oozing part comprising at least a concave part formed so that it is lower than the above stamp ink-oozing part, wherein the above stamp ink-non-oozing part comprises a heat transfer substance-transferred part having a thickness of 0.5 to 10μ and a stamp material-molten part which is molten and formed by the heat generation of the above heat transfer substance-transferred part.

The preferred stamp material has a length of 5 to 500 mm, a width of 5 to 300 mm, and a thickness of 0.5 to 30 mm.

DESCRIPTION OF THE MARKS

Figure 1A:
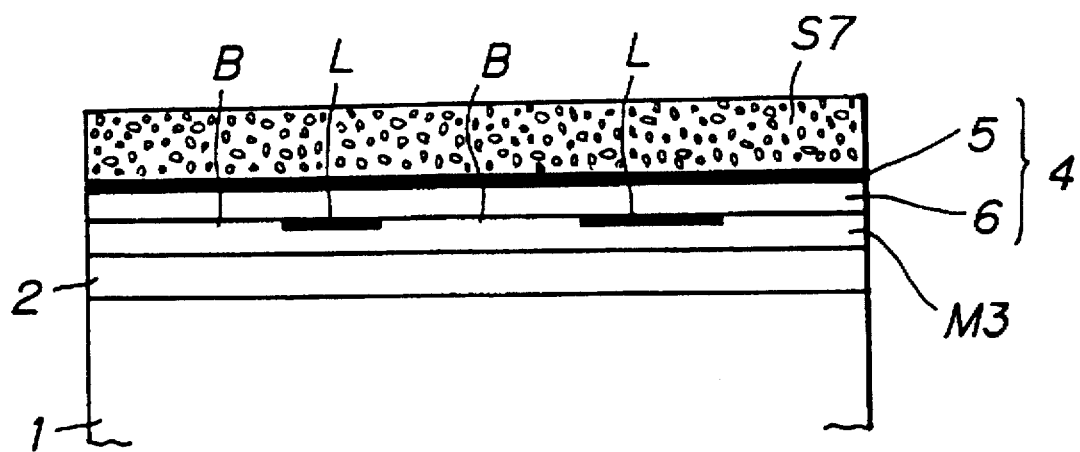
FIG. 1 is a schematic drawing for producing an ink-oozing plate for stamp, wherein the conditions of the heat transfer sheet and the stamp material (a) before irradiating with a flashlight and (b) after irradiating with the flashlight are schematically shown.

1 Flashlight emitting part
2 Glass plate
M3 Impress image copy
4 Heat transfer sheet
5 Heat transfer substance
6 Acetate film
S7 Stamp material (foamed polyethylene sheet) (stamp ink-impregnated part)
L Impress copy image
B Impress copy image-absent part
H Transfer molten part (stamp ink-non-oozing part)
I Non-transfer part (stamp ink-oozing part)
11 Heat transfer substance-transferred part
12 Stamp material molten part

DETAILED DESCRIPTION OF PREFERRED EMBODIMENTS

The stamp material used in the production method of the ink-oozing plate for a stamp (that is a stamping plate) of the present invention and having stamp ink-impregnable open cells may be of any material as far as it is a continuous porous material having an excellent self-holding ability, and includes, for example, sponge rubber of natural rubber and synthetic rubber, and a foamed synthetic resin. Preferably used is a sheet with a thickness of 0.5 to 30 mm (more preferably 0.5 to 10 mm) comprising a polyolefin series foam in which a melt temperature is 50° to 150° C. and which has fine open cells having an average pore diameter of 2 to 10μ, and a porosity of 30 to 80%.

In irradiating with a flashlight containing infrared rays in the production method of the present invention, a flashlight the light source of which is a xenon flashlight device, a photostrobo flashlight, or flashlight bulb.

The heat transfer sheet used in the production method of the present invention comprises an infrared ray-transmittable film coated with a heat transfer substance which is heated by irradiation with infrared rays. The heat transfer sheet is prepared by coating a film with a heat transfer substance such as heat transfer ink and the like containing carbon black or a high polymer which is heated by irradiation with infrared rays or by depositing the above heat transfer substance on the film. The heat transfer substance has a transfer temperature of 50° to 160° C. which is higher than the melt temperature of the stamp material.

The heat transfer substance coated on the heat transfer sheet used in the present invention has a thickness of 0.5 to 10μ, preferably 2 to 5μ, and most preferably 4 to 5μ.

The thickness of the heat transfer substance coated on the heat transfer sheet is an important element for infrared rays-irradiating conditions, and the optimum thickness is therefore influenced by a flashlight irradiating energy and the pore diameter of the stamp material. In the present invention, the pores of the stamp material are not blocked only by the transfer of the above heat transfer substance.

If the heat transfer sheet is too thin, the effect of blocking cells by the transfer of the above heat transfer substance can not be expected, and if it is too thick, not only excess flashlight irradiating energy is required, but also the heat transfer substance transferred on the surface of the stamp material forms projections on a printing face, and a level difference from a non-molten part where no cells are blocked is reversed, which leads to a stamping plate incapable of being used for stamping. Further, not only the apparatus becomes expensive but also, particularly in case of an impress image copy containing fine lines and small dots, even a non-transfer part of the material is influenced, and a sharp stamp can not be obtained.

An acetate film having a high transmittance of infrared rays is preferred as the infrared rays-transmittable film, and the thinner the thickness thereof is, the better the efficiency of flashlight irradiating energy is. However, since the film and the stamp material are adhered via the heat transfer substance, they have to be separated after irradiating with the flashlight, and the film has preferably a thickness of 10μ or more so that the film is not damaged in such case.

A copy prepared by cutting out a sheet which cuts off infrared rays and is not heated therewith in the form of an impress copy image is the best as the impress image copy used in the production method of the present invention, and the second best is a copy prepared by forming an image on a transparent film which is not heated with infrared rays and has a good transmittance with recording material such as ink or toner which does not transmit infrared rays and is not heated therewith. That is, it includes a copy prepared by drawing characters, marks and figures on a paper or a film with recording material. It is preferred in principle that a paper or a film has a high transmittance of infrared rays and that drawings such as characters, marks and figures are drawn with recording material which reflect infrared rays.

In the production method of the present invention, impress image copies produced with a PPC copying machine are preferably used as a standard to produce the best impress image copy.

At present, PPC copying machines can freely be available at enterprises, schools and convenience stores, and therefore the best impress image copies can simply be produced without mistakes even by general users having many restrictions.

An impress image copy prepared with this PPC copying machine is a copy in which characters, marks and figures are drawn with toners by copying a desired original copy with a PPC copying machine.

A significant difference in performances in terms of an absorptance of infrared rays in a PPC copying paper is not observed between various toners which are commercially available in the market, but it is observed between the thicknesses of papers which vary widely depending on copying machines. An impress image copy prepared with a PPC copying machine can be coated with a liquid substance to enhance a transmittance of infrared rays in a PPC copying paper and offset a scattering in the thicknesses of papers, whereby the transmittance of infrared rays can be almost uniformized. This method is not restricted to a copied manuscript and can be applied as well to copies written on the similar papers with writing tools such as pencil and sign pen and copies outputted from printers.

The liquid substance includes a liquid prepared by adding 20 to 50% of alcohols to water. In this case, alcohol is an auxiliary for assisting water to penetrate into paper. The liquid substance is not restricted to alcohols, and the same effect can be provided even only with water. In case of only with water, however, it takes time to penetrate into paper. In this connection, the liquid coated on an impress image copy is not restricted to water, and a substance which penetrates into a copy and has the same heat conductivity as that of water can reveal the same performance. In a different case from this, the reproducibility of fine lines can be inferior but it remains unchanged that a flashlight irradiating energy can be saved to a large extent (if the liquid is water, even when heat is generated on a copy image, the heat is hard to be transmitted to a heat transfer sheet, and therefore a sharp impress image can be obtained).

The liquid substance is used for PPC copying paper and manuscript paper in order to enhance an infrared ray transmittance (transparency) of paper itself, and to restrain the recording material from its heat generation.

In the production process of a stamping plate of the present invention, the heat transfer sheet coated with the heat transfer substance described above having a higher transfer temperature than the melt temperature of the stamp material described above is superposed on the surface of the stamp material to a thickness of 0.5 to 10µ so that the heat transfer substance contacts the surface of the stamp material; an impress image copy coated with a liquid substance containing water is superposed thereon so that the impress image copy becomes a mirror image; the copy is irradiated with a flashlight containing infrared rays from the upper part thereof in the state that the above stamp material is compressed by 5 to 70% that is changed stamp material in thickness into about 95 to 30%, to allow the infrared rays to pass through a part other than an impress copy image on the impress image copy and reach the heat transfer sheet; and the heat transfer substance is heated and transferred to form a transfer molten part (a stamp ink non-oozing part) on the surface of the stamp material. On the other hand, since the impress copy image part on the impress image copy cuts off or absorbs the infrared rays, and the part of the heat transfer sheet corresponding thereto is not heated and transferred, cells present on the surface of the stamp material corresponding thereto do not come to be blocked to form a non-transfer part (a stamp ink-non-oozing part).

The present invention is characterized in that this transfer molten part (the stamp ink-non-oozing part) comprises a heat transfer substance-transferred part and a stamp material molten part in which the stamp material is molten. In this case, the stamp ink-non-oozing part becomes more concave than the layer thickness of the heat transfer substance in the stamp ink-oozing part of the stamp material, and the stamp ink-non-oozing part can be formed with the relatively thin layer thickness. Since in the case where only the heat transfer substance-transferred part is present and the stamp material molten part is absent, the layer thickness of the heat transfer substance part has to be thickened, more flashlight irradiating energy than that in the production method of the present invention is required, which is uneconomical. That is, the production method of the present invention not only is economical since the stamp ink-non-oozing part is formed with less flashlight irradiating energy, but also since a thermal influence to the other stamp ink-oozing part is reduced, the reproduction of a fine impress copy image becomes possible, and therefore a sharp impress image can be obtained.

Since the heat transfer substance has a higher transfer temperature than that of the stamp material, the irradiation with a flashlight while compressing the stamp material drives the stamp material itself into a close contact state that no cells are present, and melts the stamp material. Accordingly, the cells in plural layers are blocked to form the stamp material-molten part.

Accordingly, in the case where the stamp ink-non-oozing part is formed only with the heat transfer substance-transferred part, the layer thickness of the heat transfer substance present on the heat transfer sheet has to be thickened. In the production method of the present invention, however, a performance as the stamp ink-non-oozing part can be obtained even with the thinner layer thickness of the heat transfer substance present on the heat transfer sheet, and a flashlight irradiating energy can be therefore reduced.

A stamp material surface having a high smoothness can reduce the compression described above and save a flashlight irradiating energy, whereby an excellent impress image can be obtained.

The stamp material used in the present invention has a cell diameter of 2 to 10µ, preferably 3 to 5µ. Since the larger cell diameter requires a larger flashlight irradiating energy for blocking cells, and this provides the trouble that cells in unnecessary parts are blocked as well. On the other hand, the smaller cell diameter blocks cells in unnecessary parts even with a slight increase in the flashlight irradiating energy, and it is therefore difficult to adjust irradiating energy.

The transfer molten part in the stamping plate obtained by compressing the stamp material described above by 5 to 70% by the preceding method becomes a concave part under the same plane, and a level difference between the transfer molten part and the non-transfer part is 0.01 mm or more, preferably 0.05 to 0.1 mm.

In the present invention, when the heat transfer substance is transferred to a thickness of 5µ with, for example, the stamp material (30 mm×50 mm×1.6 mm) having a cell diameter of about 3µ to produce a stamping plate so that a level difference between the transfer molten part and the non-transfer part becomes about 0.01 mm, a stamp into which about 2 g of stamp ink having an ink viscosity of about 1000 mPa.s can be filled and which causes no stain on a paper surface in a non-oozing part in stamping and has a long life can be obtained.

However, when a stamping plate is produced at the same energy level in the condition that this heat transfer substance is not transferred, only about 0.2 g of the stamp ink can be filled.

The ink-oozing plate for stamp obtained by the production method of the present invention has the advantage that it functions as a stamp without combining with other members, but the ink-oozing plate for stamp can be installed on a mount to prepare an ordinary stamp. In the use thereof, stamp ink is impregnated or occluded in advance into the ink-oozing plate for stamp, whereby a sharp impress image can be repeatedly obtained without supplementing the stamp ink over the long period of time.

The stamp ink occluded into a stamp, which is not volatile at room temperatures and has a viscosity of 100 3,500 mPa.s, reveals a preferred stamping performance. In particular, the stamp ink having a viscosity of 500 to 1,500 mPa.s is preferred in terms of easiness in filling into a stamp material and a stamp ink oozing amount in stamping.

A stamp ink-occluding member having a higher foaming degree than that of a stamp material of a stamping plate can be provided between the stamping plate and a mount to extend a stamping life and facilitate the supplement of the stamp ink.

The ink-oozing plate for stamp of the present invention is installed on a roll surface to make continuous printing possible by rotating the roll.

Since the production method of the present invention for the ink-oozing plate for stamp has simple steps and does not need a mold, it can rapidly provide a stamp which meets objects and has a high grade.

The transmitting efficiency of infrared rays is improved by coating an impress image copy with a liquid containing water, and a stable ink-oozing plate for stamp can be obtained even if the thicknesses of the impress image copies would be dispersed.

Further, since compressing a stamp material in irradiating with a flashlight not only causes a heat transfer substance to transfer but also causes the stamp material to completely closely contact the heat transfer substance and melt, cells are completely blocked, and a distinct transfer molten part (that is, a stamp ink-non-oozing part) is formed, whereby a stamp ink exudes smoothly from a non-transfer part (that is, a stamp ink-oozing part) in putting a stamping plate, and a therefore sharp impress image can be obtained.

EXAMPLE

The example of the present invention will be explained below with reference to the drawings.

Production of an Impress Image Copy

A printed matter was copied with a PPC copying machine to prepare an impress image copy 3 having an impress copy image L.

Production of a Stamping Plate

An impress copy image L on an impress image copy M3 is superposed on a transparent glass plate 2 of a xenon flashlight emitting device 1 having an emitting energy of 50 joules so that the impress copy image L becomes an ordinary image, and this impress image copy M3 is coated with a liquid substance (an ethanol 50 volume % aqueous solution). Further, a heat transfer sheet 4 is superposed thereon with a heat transfer substance face 5 turned upward, and a stamp material (foamed polyethylene sheet) S7 which has fine open cells of 3µ having a cross-linked network structure and which has a porosity of 60%, a melt temperature of about 70° C. and a thickness of 1.6 mm is superposed thereon [refer to FIG. 1(a)].

The heat transfer sheet 4 used here was prepared by coating an acetate film 6 (thickness: 20 µm) with a heat transfer substance 5 (having a melt temperature of 80° C., which is higher than that of the foamed polyethylene sheet) comprising wax, a resin and carbon black to a thickness of 3 µm.

Figure 1B:
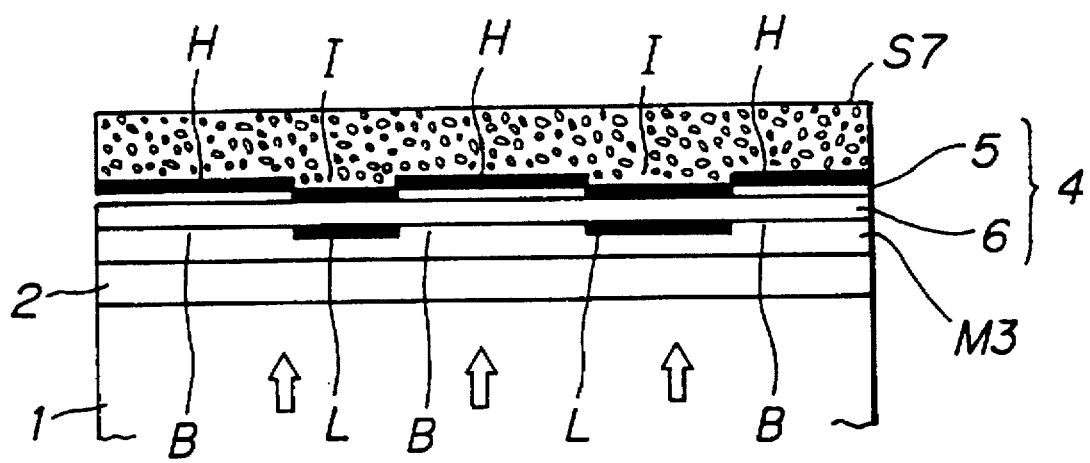
Figure 2:
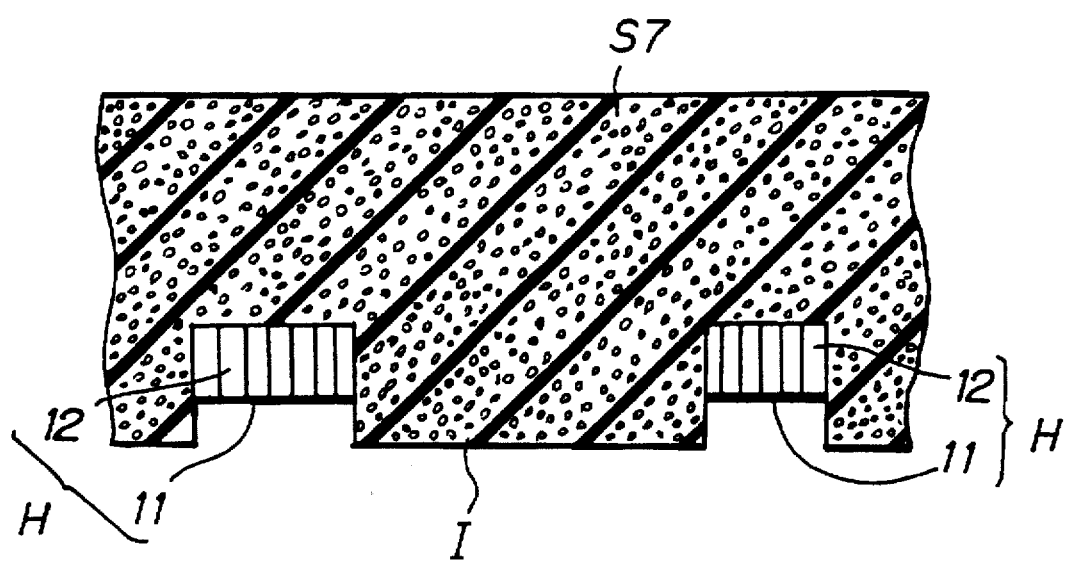
FIG. 2 is an enlarged sectional view of the transfer molten part (the stamp ink-non-oozing part) and the non-transfer part (the stamp ink-oozing part).

Next, a flashlight was applied in the state that pressure was exerted so that the above stamp material S7 was compressed to a thickness of 0.8 mm. As shown in FIG. 1(b), in the case where the heat transfer sheet 4 provided thereon with the heat transfer substance 5 was used, a stamp material surface corresponding to the impress copy image L on the impress image copy M3 became a non-transfer part I on the surface of the above stamp material S7 and remained as a mirror image. The other stamp material surface was transferred on the surface of the above stamp material S7 by the heat generation of the heat transfer substance, and at the same time, the heat transfer substance melted the stamp material to form a heat transfer-molten part H (the stamp ink-non-oozing part) [refer to FIG. 2].

The cells are compressed since the stamp material is compressed, so that the heat transfer substance is transferred on the surface of the stamp material sheet in the state that the stamp material itself is tight, and at the same time, the above heat generation melts and blocks the open cells in plural layers.

When the thickness of the heat transfer substance provided on the heat transfer sheet described above was 2 to 5µ, an energy efficiency in irradiating with a flashlight was high, and the impress image was sharp in putting a stamping plate.

However, a saving effect of a flashlight irradiating energy can be observed even with the thickness of about 0.5µ as compared with the case where the heat transfer substance coated on the heat transfer sheet is not the heat transfer substance.

On the other hand, even if the thickness thereof is increased to about 10µ, a stamping plate can be produced. In such case, however, a larger flashlight irradiating energy is required, and the stamp material has to be compressed furthermore in order to provide a suitable level difference on the printing face.

What is claimed is:

1. A production method for manufacturing an ink-oozing plate for a stamp, comprising the steps of:

superposing a heat transfer sheet comprising an infrared ray-transmittable film coated thereon with a heat transfer substance on the surface of an elastic resin-made stamp material having stamp ink-impregnable open cells so that said heat transfer substance contacts the surface of the stamp material;

superposing thereon a desired impress image copy so that it becomes a mirror image;

compressing the stamp material;

irradiating with a flashlight containing infrared rays from the upper part of said copy to allow the infrared rays to be transmitted through a copy image-absent part on the impress image copy and cause the infrared rays reaching the heat transfer sheet to heat the heat transfer substance present on a part corresponding to said copy image-absent part;

causing said heat transfer substance to transfer on the surface of the stamp material and melt the surface layer of the stamp material to form a transfer molten part where the open cells are blocked, and allowing the copy image part on the impress image copy to cut off or absorb the infrared rays to cause no heat transfer substance present on the pan of the heat transfer sheet corresponding thereto to be heated and transferred, which does not lead to blocking the cells present on the surface of the corresponding stamp material, to form a non-transfer part.

2. A production method of an ink-oozing plate for stamp as described in claim 1, wherein the stamp material is a sheet with a thickness of 0.5 to 30 mm comprising polyolefin series foam in which the melt temperature is 50° to 150° C. and which has fine open cells having a cross-linked network structure and an average pore diameter of 2 to 10μ, and a porosity of 30 to 80%; and the heat transfer sheet is prepared by coating an infrared ray-transmittable sheet with the heat transfer substance containing at least carbon or a high polymer and having a transfer temperature of 50° to 200° C. to a thickness of 0.5 to 10μ.

3. A production method of an ink-oozing plate for stamp as described in claim 1, wherein a flashlight is applied in the state that the stamp material is compressed by 5 to 70% to form a concave part in which the stamp ink-non-oozing part of the stamp material resides at least in a lower plane than the stamp ink-oozing part.

4. A production method of an ink-oozing plate for stamp as described in claim 1, wherein the impress image copy is coated with a liquid substance.

* * * * *